(12) United States Patent
Varma et al.

(10) Patent No.: US 6,359,863 B1
(45) Date of Patent: Mar. 19, 2002

(54) RATE ALLOCATION SYSTEM AND METHOD FOR ATM SWITCHED NETWORKS

(75) Inventors: Anujan Varma, Santa Cruz, CA (US); Lampros Kalampoukas, Eatontown, NJ (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 09/220,539

(22) Filed: Dec. 24, 1998

Related U.S. Application Data

(60) Provisional application No. 60/096,286, filed on Aug. 12, 1998.

(51) Int. Cl.[7] ............................. G01R 31/08; H04J 3/24
(52) U.S. Cl. ....................................... 370/232; 370/468
(58) Field of Search ................................ 370/229, 230, 370/231, 232, 233, 234, 235, 253, 377, 395, 397, 399, 409, 468, 465, 252

(56) References Cited

U.S. PATENT DOCUMENTS 5,675,576 A * 10/1997 Kalampoukas et al. ..... 370/232
6,069,872 A * 5/2000 Bonomi et al. ............. 370/236

* cited by examiner

Primary Examiner—Kwang B. Yao
Assistant Examiner—Brenda H. Pham
(74) Attorney, Agent, or Firm—John P. O'Banion

(57) ABSTRACT

A method for rate allocation within the individual switches of a communication network implementing a rate-based congestion control approach for best-effort traffic. The method enables a guaranteed minimum bandwidth to be allocated to each communication session or connection, in addition to fairly dividing the available bandwidth among the competing connections. The method also estimates the transmission rate of each connection, instead of relying on explicit indications provided by the connection, and uses this information in the computation of its fair share of bandwidth. The method also calculates the available bandwidth on the link where the bandwidth is allocated, by measuring the utilization of the link periodically. Finally, the method incorporates a mechanism to detect connections that remain idle and withdraw allocations from them so as to avoid under-utilization of the link bandwidth.

18 Claims, 21 Drawing Sheets

*FIG. 6A*

/* Pseudo-code invoked on receipt of forward RM cell from connection $i$ */

1. $i \leftarrow cell(VC)$     /* get the VC number */
2. $ER_i \leftarrow cell(ER); \quad CCR_i \leftarrow cell(CCR)$     /* read ER and CCR fields of RM cell */
   /* The current rate assumed by the algorithm is the minimum of the value in the $CCR_i$ field and the measured rate, $CCR_m$ */
3. $CCR_i \leftarrow \min(CCR_i, CCR_m)$
4. $MCR_i \leftarrow cell(MCR)$     /* read MCR value from RM cell */
5. $\rho_i \leftarrow \min(ER_i, CCR_i)$     /* $\rho_i$ is the request of connection $i$ */
   /* Compute maximum local allocation $A_{max}$ . */
6. $B_{eq} \leftarrow B_a/(N - N_l)$     /* compute equal share */
7. if $state_i = bottlenecked$ then
8.     $A_{max} \leftarrow B_{eq} + B_j/N_b$ 9. else
10. $A_{max} \leftarrow B_{eq} + (B_f + A'_i - B_{eq})/(N_b+1)$
11. end if
12. $A_{max} \leftarrow \max(A_{max}, B_{eq})$ /*MCR must always be satisfied */

13. if $A_{max} < MCR_i$ then
14. $\rho_i \leftarrow MCR_i; A_{max} \leftarrow MCR_i$
15. if $state_i = bottlenecked$ then
16. $state_i = satisfied; N_b \leftarrow N_b - 1$
17. end if

/* If the connection was not already MCR limited, mark it as being so */

18. if not $MCRlimited_i$ then
19. $MCRlimited_i \leftarrow 1$

FIG. 6B

20. $B_l \leftarrow B_l - MCR_i; B_a \leftarrow B_a - MCR_i$
21. $N_l \leftarrow N_l + 1; B_{eq} \leftarrow B_a/(N - N_l)$
22. end if
    /* If the connection is already marked as MCR limited, it must be un-marked */
23. else
24.   if *MCRlimited$_i$*
25.     *MCRlimited$_i$* $\leftarrow 0$
26.     $B_l \leftarrow B_l - MCR_i; B_a \leftarrow B_a + MCR_i$
27.     $N_l \leftarrow N_l - 1; B_{eq} \leftarrow B_a/(N - N_l)$
28.   end if
29. end if
    /* Determine new state of connection if it has not been marked as MCR limited*/
30. if not *MCRlimited$_i$* then

31.     if $(A_{max} < \rho_i)$ and $(state_i = satisfied)$ then
32.         $state_i \leftarrow bottlenecked; N_b \leftarrow N_b + 1$
33.     end if
34.     if $(A_{max} > \rho_i)$ and $(state_i = bottlenecked)$ and $(i \neq MaxVC)$ then
35.         $state_i \leftarrow satisfied; N_b \leftarrow N_b - 1$
36.     end if
37. end if
   /* Compute the local allocation $A_i^*$ */
38. if $(state_i = satisfied)$ then
39.     $A_i \leftarrow \rho_i$
40. else
41.     $A_i \leftarrow A_{max}$
42. end if

/* Update ER field of RM cell */

43. cell(ER) ← min($A_{max}$, $ER_i$)

/* Maintain state of a non MCR limited connection with the largest allocation as bottlenecked */

44. if not *MCRlimited$_i$* then

45.     if ($\rho_i >$ *MaxAllocation*) then    /* mark this VC as the one with the largest allocation */

46.         *MaxVC* ← *i*; *MaxAllocation* ← $\rho_i$

47.         if (*state$_i$* = *satisfied*) then    /* mark it as bottlenecked */

48.             *state$_i$* ← *bottlenecked*; $N_b$ ← $N_b + 1$

49.         end if

50.     end if

51.     if (*MaxVC* = *i*) and ($\rho_i <$ *MaxAllocation*)

52.  /* This is the VC with the largest allocation and its allocation went down */
53.  $MaxAllocation \leftarrow \rho_i$;  /* update largest allocation */
54.  end if
55.  else
56.  if $(i = MaxVC)$
     /* The maximum allocation is for an MCR limited connection; trigger a new search */
57.  $MaxVC \leftarrow -1$
58.  $MaxAllocation \leftarrow 0$
59.  end if
60.  end if
     /* Update local allocation maintained in the switch, $A_i'$ */
61.  $A_{old} \leftarrow A_i'$
62.  if $(state_i = satisfied)$ then

63.     $A'_i \leftarrow A_i$
64. else
65.     $A'_i \leftarrow B_{eq}$
66. end if
    /* Update free bandwidth $B_f$ */
67. $B_f \leftarrow B_f + A_{old} - A'_i$
68. forward(cell)      /* forward RM cell to the next switch */

FIG. 6G

| Symbol | Description |
|---|---|
| $i$ | VC number of the connection that the received RM cell belongs to |
| $state_i$ | State of connection $i$: bottlenecked or satisfied |
| $\rho_i$ | Bandwidth requested by the current connection |
| $N$ | Total number of connections sharing the outgoing link bandwidth controlled by the algorithm |
| $N_b$ | Number of connections in bottlenecked state |
| $B_a$ | The total bandwidth available for allocation to the connections controlled by the algorithm |
| $B_{eq}$ | The equal share of bandwidth. Each connection gets at least this bandwidth unless its request is less than $B_{eq}$. |
| $B_f$ | The free-bandwidth variable used by the algorithm |
| $A_{max}$ | The maximum amount of bandwidth available for allocation to connection $i$ |

| | |
|---|---|
| $MCRlimited_i$ | Flag to indicate if connection $i$ is MCR-limited |
| $N_l$ | Number of MCR-limited connection among those sharing the link |
| $B_l$ | Total bandwidth allocated to MCR-limited connections |
| $MaxVC$ | Index of VC with largest allocation |
| $MaxAllocation$ | Bandwidth allocation f VC with largest allocation |
| $A_{old}$ | Temporary variable used by the algorithm |
| $A'_i$ | Local allocation maintained by the switch for connection $i$ |
| $A_i$ | Variable for temporary storage of the allocation |

/* Pseudo-code invoked on receipt of backward RM cell from connection $i$ */

1. $i \leftarrow \text{cell(VC)}$     /* get the VC number */

2. $ER_i \leftarrow \text{cell(ER)}$     /* Read ER field from backward RM cell */

/* Set the ER value to the minimum of the current value and the local allocation in the forward path */

3. $\text{cell}(ER) \leftarrow \min(ER_i, A_i)$

4. Forward cell

FIG. 8

/* Computation of average link utilization */

/* Executed every $\tau$ msecs */

1. $U_\tau \leftarrow m_\tau/(T \cdot B)$     /* Measure utilization in the last $\tau$ secs interval */

2. $U \leftarrow (1-w)U + wU_\tau$     /* Compute average utilization using exponential averaging */

3. $U \leftarrow \min(1, U)$     /* Utilization should not exceed a value of 1 */

4. $m_\tau \leftarrow 0$     /* Reset number of cells received in the last $\tau$ secs */

/* Update quantities needed for performing the rate allocation */

5. $B'_a \leftarrow \min(B - B_v - B_l + (1-U)B, B)$

6. $B_f \leftarrow B_f + B'_a - B_a$

7. $B_a \leftarrow B'_a$ 8. if $N - N_l > 0$ then

9.     $B_{eq} \leftarrow B_a/(N - N_l)$

10. end if

/* Initializations per Port */

1. $B \leftarrow$ link capacity
2. $B_f \leftarrow B$
3. $B_a \leftarrow B$
4. $B_l \leftarrow 0$
5. $B_v \leftarrow 0$
6. $N \leftarrow 0$
7. $N_b \leftarrow 0$
8. $N_l \leftarrow 0$
9. $MaxAllocation \leftarrow 0$
10. $MaxVC \leftarrow -1$
11. $U \leftarrow 1$
12. $m_\tau \leftarrow 0$ /* Steps for opening connection $i$ */

1. $i \leftarrow \text{cell(VC)}$
2. $N \leftarrow N+1$
3. $B_{eq} \leftarrow B_a/(N-N_l)$
4. $state_i \leftarrow satisfied$
5. $MCRlimited_i \leftarrow 0$
6. $A_i' \leftarrow 0$

/* Steps for closing connection $i$ */

1. $i \leftarrow \text{cell}(VC)$
2. $N \leftarrow N - 1$
3. $B_f \leftarrow B_f + A_i'$
4. if $state_i = bottlenecked$ then
5.     $N_b \leftarrow N_b - 1$
6. end if

/* Trigger a search for the next connections with max allocation */

7. if $MaxVC = i$ then
8.     $MaxAllocation \leftarrow 0$
9.     $MaxVC \leftarrow -1$
10. end if
11. if $MCRlimited_i$ then
12.     $B_l \leftarrow B_l - MCR_i$

FIG. 12B

13. $N_l \leftarrow N_l - 1$
14. end if
15. $B_a \leftarrow \min(B - B_v - B_l + (1-U)B, B)$
16. if $N - N_l > 0$ then
17. $B_{eq} \leftarrow B_a / (N - N_l)$
18. end if

RATE ALLOCATION SYSTEM AND METHOD FOR ATM SWITCHED NETWORKS

CROSS-REFERENCE TO RELATED APPLICATIONS

This application claims priority from U.S. provisional application Ser. No. 60/096,286 filed on Aug. 12, 1998.

STATEMENT REGARDING FEDERALLY SPONSORED RESEARCH OR DEVELOPMENT

Not Applicable

REFERENCE TO A MICROFICHE APPENDIX

Not Applicable

NOTICE OF MATERIAL SUBJECT TO COPYRIGHT PROTECTION

All of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office file or records, but otherwise reserves all copyright rights whatsoever.

BACKGROUND OF THE INVENTION

1. Field of the Invention

This invention pertains generally to congestion control systems for communications networks, and more particularly to rate allocation in ATM switched networks.

2. Description of the Background Art

Asynchronous Transfer Mode (ATM) is a networking protocol designed to efficiently support high speed digital voice and data communications. Broadband packet networks based on ATM enable the integration of traffic with a wide range of characteristics within a single communication network. In these networks, all communication at the ATM layer is in terms of fixed-size packets, called "cells" in ATM terminology. An ATM cell consists of 48 bytes of payload and 5 bytes for the ATM-layer header. Routing of cells is accomplished through packet switches over virtual circuits set up between endpoints. By the use of proper traffic scheduling algorithms, ATM is capable of handling multiple classes of traffic ranging from real-time video to best-effort traffic requiring no quality-of-service guarantees. An industry group, the ATM Forum, has defined a family of service categories to address these classes of traffic—specifically: Constant Bit Rate (CBR) service, Variable Bit Rate (VBR) service, Unspecified Bit Rate (UBR) service and Available Bit Rate (ABR) service.

A primary motivation for development of the ABR service category was the economical support of data traffic where each packet of data is segmented into ATM cells. Such "best-effort" traffic is generally characterized as having no real-time deadlines and requiring weak guarantees on the available bandwidth, delay, or cell loss rate. This "best-effort" mode is similar in nature to the service provided by the current Internet (generally using the Transmission Control Protocol (TCP) or User Datagram Protocol (UDP)), except that connections still need to be set up at the ATM layer over virtual circuits between endpoints, either explicitly or implicitly.

ATM raises new opportunities for implementing congestion control at a lower layer, providing the potential for improving the performance of TCP even above that obtained in today's datagram networks. The higher speed and possibly better congestion control algorithms which may arise with ATM's ABR service offer promise even for protocols designed for today's datagram service. The fixed size of ATM cells simplifies the implementation of the switching function in many cases, thus enabling ATM networks to scale up to high speeds.

While a number of congestion-control approaches for best effort traffic in ATM networks have been developed, they exhibit a number of problems including, in many cases, failure to achieve fairness in the allocation of link capacity among competing data flows, complicated buffering and/or queuing schemes, and, in some cases an absence of an end-to-end perspective for the control mechanism. Additionally, most of these approaches require either prior knowledge of the network configuration in order to set correctly the appropriate parameters or cooperation between the high-level protocols and the congestion control mechanisms at the ATM-layer.

One particular congestion control method, explicit rate setting, has been chosen by the ATM Forum as the best match for the ABR service. This method controls the bandwidth allocation to the connections directly. Since each ATM cell contains the same number of bits, control of a connection's bandwidth, measured as a bit rate, is achieved by directly controlling its cell rate, hence the approach is referred to as rate-based flow control. Control of the cell rate for a connection would occur at least at the transmission source, which would shape the connection's traffic as directed by feedback from the network. Optionally, such control may occur at points within the network as well. Under a rate-based framework, the share of bandwidth allocated to a connection is not supposed to depend on the delays between points where data is shaped on a per-connection basis.

The rate-based congestion control approach has the potential to provide close-to-ideal throughput with a fraction of the buffering required by link-level flow control, especially for wide area networks. With explicit rate setting, the source of each connection periodically transmits a special resource management (RM) cell. The RM cell specifies the bandwidth requested by the connection. Each switch on the path of the RM cell may modify the request based on the bandwidth it is able to allocate to the connection on its outbound link. On reaching its destination, the RM cell, having had its bandwidth request reduced by any switch unable to allocate the requested bandwidth, is returned to the source, which will then set its rate based on that of the bottleneck link in the path of the connection.

Significantly, however, the rate-based approach requires an algorithm for fair allocation of bandwidth among the connections sharing a common output link of a switch. On receipt of an RM cell from a connection (or, in the general case, a packet containing comparable information), the algorithm is invoked to determine the current bandwidth allocation of the connection on the output link, taking into account the available bandwidth and the current allocations of other connections.

The most robust method for fair rate allocation in packet-switching networks heretofore developed is disclosed in U.S. Pat. No. , 5,675,576 to Kalampoukas et al. issued on Oct. 7, 1997, which is incorporated herein by reference. The scheme developed by Kalampoukas et al. addresses rate-based congestion control while still maintaining the max-min fairness criterion. The algorithm described by Kalampoukas et al. requires only a constant number of steps on receipt of an RM cell, in its computation of a fair allocation of the bandwidth for each connection. The algorithm, however, does not support the provision of a minimum guaranteed bandwidth for the connections, but instead treats all the connections equally in distributing the available bandwidth among the set of connections sharing the output link of the switch. Yet, the ability to provide such a guaranteed rate is essential to the support of certain applications, for example, those based on voice or video. In addition, the algorithm described by Kalampoukas et al. requires as an input the total available bandwidth on the output link as a parameter. In practice, however, this parameter may vary from instant to instant and a mechanism is required to estimate it dynamically. Likewise, their method also requires as input the current rate of each connection, typically conveyed within a field in the RM cell, to perform the computations. However, in practice this rate information carried within the RM cell may not correspond to the actual rate of the connection, resulting in inaccuracies in the computations, thus leading to under-utilization or congestion at the output link. Therefore, a means of estimating this actual rate of the connection is essential to avoiding such inaccuracies. Finally, the algorithm described by Kalampoukas et al. does not provide a mechanism for recovering bandwidth from connections that remain idle for a long time, resulting in under-utilization of the bandwidth of the output link.

Therefore, there is a need for a rate-based congestion control scheme that supports a minimum guaranteed rate per connection, has means of estimating the bandwidth of each connection from its actual bandwidth usage, has means for estimating the available bandwidth on the output link, and has an aging mechanism for recovering bandwidth from connections that remain idle for prolonged periods. The present invention satisfies those needs, as well as others, and overcomes the deficiencies of previously developed rate-based congestion control methods.

SUMMARY OF THE INVENTION

In general terms, the present invention comprises a congestion control method for communications networks that causes a data source to periodically inject, into a flow of data from that source, a first indicator representative of a rate at which the source is currently transmitting data to the network and a second indicator representative of a rate at which the source is desirous of transmitting data. The invention then determines an allocation according to a predetermined criterion for bandwidth to be apportioned among competing data flows at switches within the network, and operates on the second indicator sent by the source at successive switches in a transmission path in that network between the source and a destination to compare the rate represented by that second indicator with a maximum rate allocation determined by each switch. Where the rate represented by the second indicator is greater than that maximum rate allocation, the invention causes the rate representation in the second indicator to be changed to that maximum rate allocation. After the first and second indicators from the source under consideration have traversed all switches in the network transmission path between that source and the addressed destination, the invention causes those first and second indicators to be returned to the source, whereby any modification of the rate represented by the second indicator by any of the traversed switches operates to establish a maximum data transmission rate for that source.

More particularly, and by way of example and not of limitation, the present invention facilitates its implementation in the switch chipset and enables the algorithm to utilize any unused bandwidth on the outgoing link, thereby improving its responsiveness to changes in available bandwidth. Bandwidth allocations in the algorithm described in U.S. Pat. No. 5,675,576 to Kalampoukas et al. were made based on the requests contained in the CCR (Current Cell Rate) field of the RM cell. However, in practice, the CCR value obtained from the RM cell may not correspond to the actual rate of the connection. The latter may in fact be much lower than the former, resulting in severe under-utilization of the link.

Accordingly, in accordance with an aspect of the present invention, instead of using the value in the CCR field of the RM cell for rate allocation, we estimate the transmission rate of each connection by measuring the interval between the reception of $\gamma$ RM cells from the given connection. This estimated rate is then used as the requested rate to the rate allocation algorithm. If $n_j$ cells from connections; are received during an interval $t_j$ in which $\gamma$ RM cells were received, then the current transmission rate $CCR_j$ of the connection is set equal to $n_j/t_j$. Note that when the CCRs are computed using this approach, the higher the rates the more frequent the updates. For our simulations, we set the value of $\gamma$ as 2.

In accordance with another aspect of the invention, in order to add a level of protection against bursty and/or misbehaving sources, the algorithm prechecks if the estimated CCR exceeds the value in the CCR field. In the general case, the minimum of the estimated CCR and the CCR value provided by the RM cell is used as the input to the rate allocation algorithm.

In accordance with still another aspect of the invention, the algorithm takes into account the minimum cell rate (MCR) requirements of ABR connections, still maintaining the max-min fairness when the MCR parameter for each connection is less than its max-min fair allocation. Connections for which the max-min fair rate is less than MCR are called MCR-limited connections. MCR-limited connections are allocated a bandwidth equal to their respective MCRs to satisfy the minimum rate requirement. For the correct operation of the algorithm the number of MCR-limited connections, N., is maintained, as well as the sum of MCRs of MCR-limited connections, denoted as $B_l$.

In accordance with a further aspect of the invention the algorithm maintains an estimate of the link utilization U and uses this estimate to determine the bandwidth available for ABR traffic, denoted as $B_a$. If the measured link utilization is greater than one, it is clamped to one. This protects the network from unnecessary oscillations.

Note that, if a rate-allocation algorithm modifies the allocation of a connection only upon receipt of an RM cell from the connection, a connection that remains idle for a long period can maintain its allocation at the switch, potentially causing under-utilization of the link bandwidth. In accordance with still another aspect of the present invention, the solution lies in periodically scanning the allocation table and reducing the allocations for connections that have not transmitted an RM cell within a timeout interval, maintaining only a minimum rate (MCR) for these connections. This scanning algorithm can be run as a background process that is interrupted on receipt of an RM cell, which invokes the rate allocation algorithm. This component of the algorithm has not been used in the simulations, but will be incorporated in the actual implementation.

In accordance with another aspect of the invention, if processing of backward RM cells (BRMs) is possible, the algorithm can be made more responsive to traffic changes in certain network topologies. In this case, the rate allocation of the algorithm is still performed on receipt of forward RM cells, but the ER value in the backward RM cell is marked down to the local allocation computed by the algorithm of the latter is smaller than the former. This improves the responsiveness of the algorithm, particularly when congestion starts to occur.

It is therefore an object of the invention to provide a minimum guaranteed rate for the connections as specified in the Minimum Cell Rate (MCR) field of the RM cell.

Another object of the invention is to provide a rate allocation algorithm having an execution time of order one: $\Theta(1)$.

Another object of the invention is to provide a rate allocation algorithm that is independent of the number of virtual channels sharing the output link.

Another object of the invention is to provide a rate allocation algorithm that can be implemented in ATM switches carrying a large number of virtual channels.

Another object of the invention is to provide a rate allocation algorithm where, when the total available capacity or the requests of the individual connections change, the algorithm quickly converges to the max-min allocation with a worst-case convergence time of $$\Theta\left(M\left(2D + \frac{1}{R}\right)\right),$$

where D is the round-trip delay, M is the number of distinct values in the max-min allocation, and R is the rate at which resource-management (RM) cells are transmitted by each source.

Another object of the invention is to provide a rate allocation algorithm that is asynchronous and distributed in nature, does not require cooperation of all the switches in the network, and can be applied in a network with varying link speeds.

Another object of the invention is to provide a rate allocation algorithm that is asynchronous and distributed in nature, attains max-min bandwidth allocations and requires a constant number of simple computations for every RM cell received, thus reducing the asymptotic complexity to $\Theta(1)$.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

FIG. 6A through FIG. 6G is a listing of pseudocode corresponding to the rate allocation method of the invention for forward RM cell processing.

FIG. 7 is a listing of definitions and notations for the algorithm pseudocode of FIG. 6.

FIG. 8 is a listing of pseudocode corresponding to the rate allocation method of the invention for backward RM cell processing.

FIG. 9 is a listing of pseudocode corresponding to the rate allocation method of the invention for computation of the average link utilization.

FIG. 10 is a listing of pseudocode corresponding to the rate allocation method of the invention for port initialization.

FIG. 11 is a listing of pseudocode corresponding to the rate allocation method of the invention for opening a connection i.

FIG. 12A and FIG. 12B is a listing of pseudocode corresponding to the rate allocation method of the invention for closing a connection i.

DETAILED DESCRIPTION OF THE INVENTION

For clarity of explanation, the illustrative embodiment of the present invention is presented as comprising individual functional blocks (including functional blocks labeled as "processors"). It will be appreciated that the functions represented by these blocks may be provided through the use of either shared or dedicated hardware, including, but not limited to, conventional hardware capable of executing software. For example, the functions of processors presented in FIG. 3 and FIG. 4 may be provided by a single shared processor. (Use of the term "processor" should not be construed to refer exclusively to hardware capable of executing software.) Illustrative embodiments may comprise microprocessor and/or digital signal processor (DSP) hardware, such as the AT&T DSP16 or DSP32C, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

Figure 1:
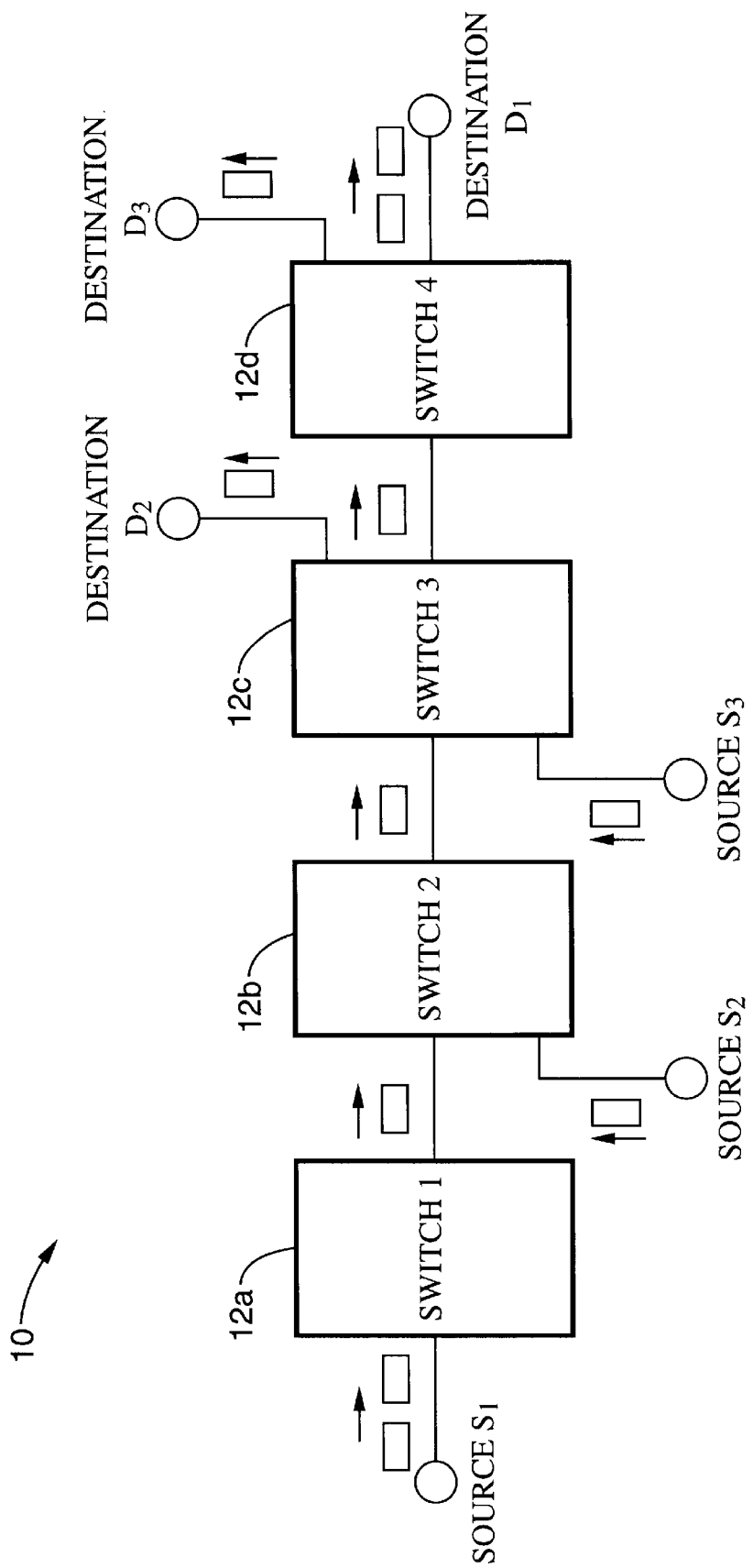
FIG. 1 if a functional block diagram of an exemplary network configuration for implementing the system of the invention.

As will be readily understood, the congestion control method of the invention is implemented within a communications network. A simplified, but nonetheless illustrative such network 10 is shown in FIG. 1. In FIG. 1, the network is depicted as comprising four switches 12a, 12b, 12c, 12d connected in tandem to provide a network for interconnecting various host computers depicted as either a source or a destination for communications traffic transmitted across the network. Illustratively, a communications path from Source $S_2$ to Destination $D_2$ would traverse the path from an input port for Switch 2, through that switch and out at an output port therefrom, thence over a transmission line connecting Switches 2 and 3 and into an input port of Switch 3. After being switched to an appropriate output port by Switch 3, the path would continue from that output port to Destination $D_2$.

Because the congestion control method of the invention is connection oriented, we choose, in a preferred embodiment, to illustrate the implementation of virtual circuits in the network of FIG. 1. In that embodiment, all of the packets belonging to a particular virtual circuit will traverse the same path though the network from source to destination. It will be appreciated, however, that the network could be implemented as a connectionless, or datagram network, and that the method of the invention would still operate, albeit with some degradation of performance levels. By having a switch maintain state on a source-destination basis, we could come close to the result described herein. The identity of a connection would be based on a mapping of the source-destination addresses to a unique identity.

In the virtual circuit implementation of the congestion control framework of our invention, the rate of transmission of packets belonging to each virtual circuit is controlled individually by the source of the virtual circuit, based on a feedback mechanism. Within each virtual circuit the source periodically transmits congestion control information. Such information may be transmitted as separate packets or may be piggy-backed onto data packets. In the preferred embodiment of the invention, such congestion control information is transmitted via separate packets, and in the particular context of ATM technology, those separate packets are designated as resource management (RM) cells. Once the RM cells reach the destination of the virtual circuit, they are returned to the source via a reverse path in the network. In the preferred embodiment of the invention, all of the processing required for bandwidth allocation according to the method of the invention is performed when an RM cell travelling in the forward direction is received at a switch. In this embodiment, no processing is performed by the switches on an RM cell traveling backward to the source, although it will be apparent that the forward direction processing of the preferred embodiment could readily be implemented in the rearward direction.

The rate allocation algorithm of our invention, which will be described in detail hereafter, is applied to each switch of the network independently. Within a switch, separate instances of the algorithm are executed at each output port of the switch (or input port in the case of an input buffered switch) to control the allocation of bandwidth among the connections sharing the corresponding outgoing link. However, it should be understood that the allocation may be performed by a central processor in the switch which is responsible for managing each one of the outgoing links.

Figure 2:
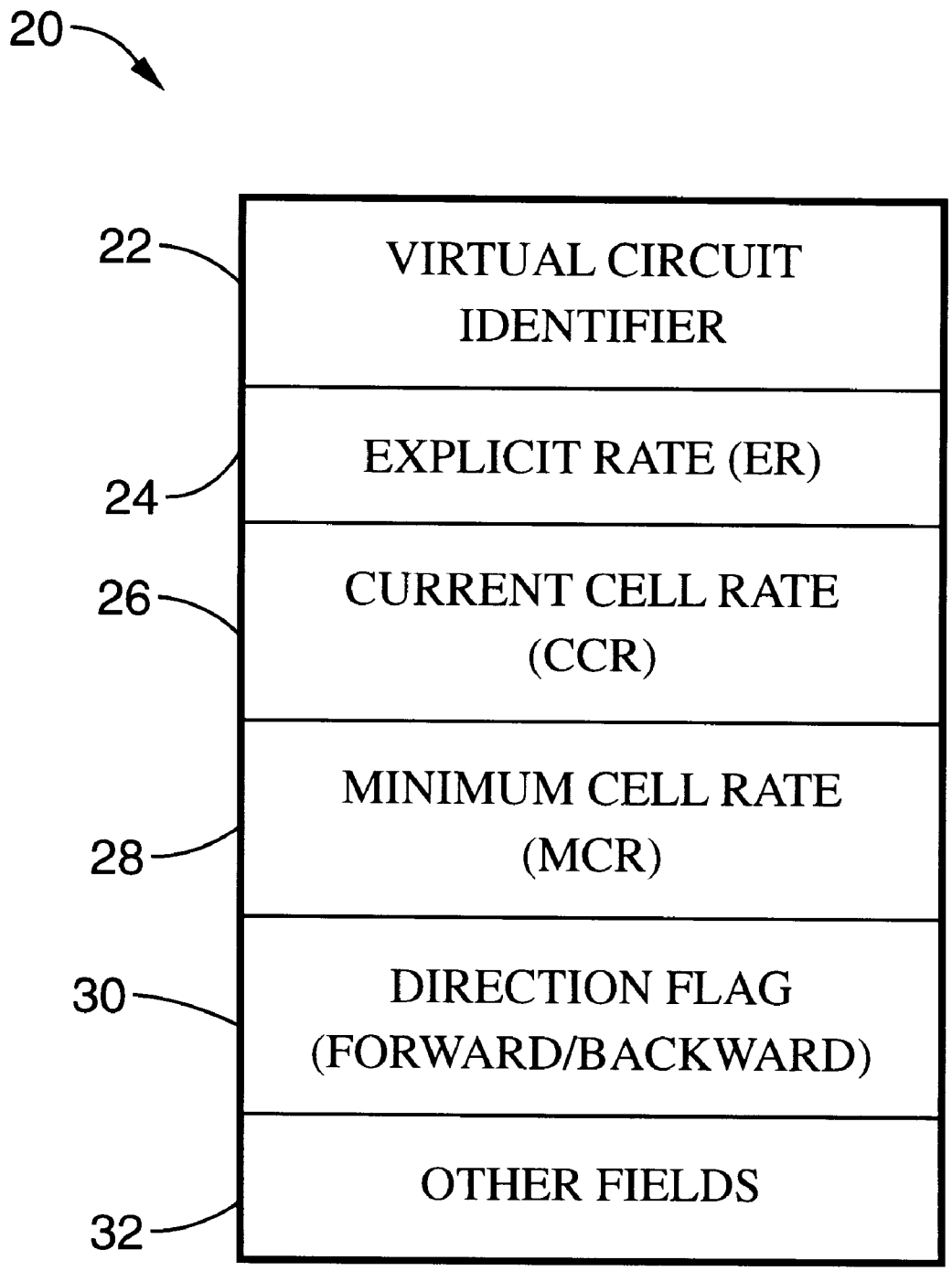
FIG. 2 is a diagram showing the required fields for a congestion control information packet associated with the method of the invention.

FIG. 2 depicts the required fields for the congestion control information packet 20 associated with the method of the invention. As can be seen, the packet includes the following fields: virtual circuit identifier 22, explicit rate (ER) 24, current cell rate (CCR) 26, minimum cell rate (MCR) 28, direction flag 30, and other fields 32. The specific designators shown in that figure for those fields correspond to designations adopted by the ATM Forum for the fields of an RM cell. In the operation of the method of the invention, the Explicit Rate (ER) field 24 is set by the source of the virtual circuit connection to the amount of bandwidth it requests. The rate allocation algorithm of our invention operating in a switch on the path of the connection may modify this field as the RM cell passes through the switch, by reducing the value thereof to the maximum amount of bandwidth it is able to allocate to the connection on the outgoing link, if such maximum amount is less than the value in the ER field of the received RM cell.

The CCR field 26 is set by the source of the connection and is not modified by the switches. This field indicates the current transmission rate of the source. It is assumed that the source would set the CCR field based on the ER value in the RM cell that was returned by the network most recently. The latter value represents the bandwidth available at the bottleneck link in the network at the time the most recent RM cell traversed it. Note also that the congestion control information packet needs to specify the virtual circuit it belongs to (although this could be part of the normal packet header), and the direction of the packet (forward/backward), to facilitate the performance of the rate allocation algorithm as the packet passes through the switch in one direction, and the passage through the switch without processing as it travels in the reverse direction.

Figure 3:
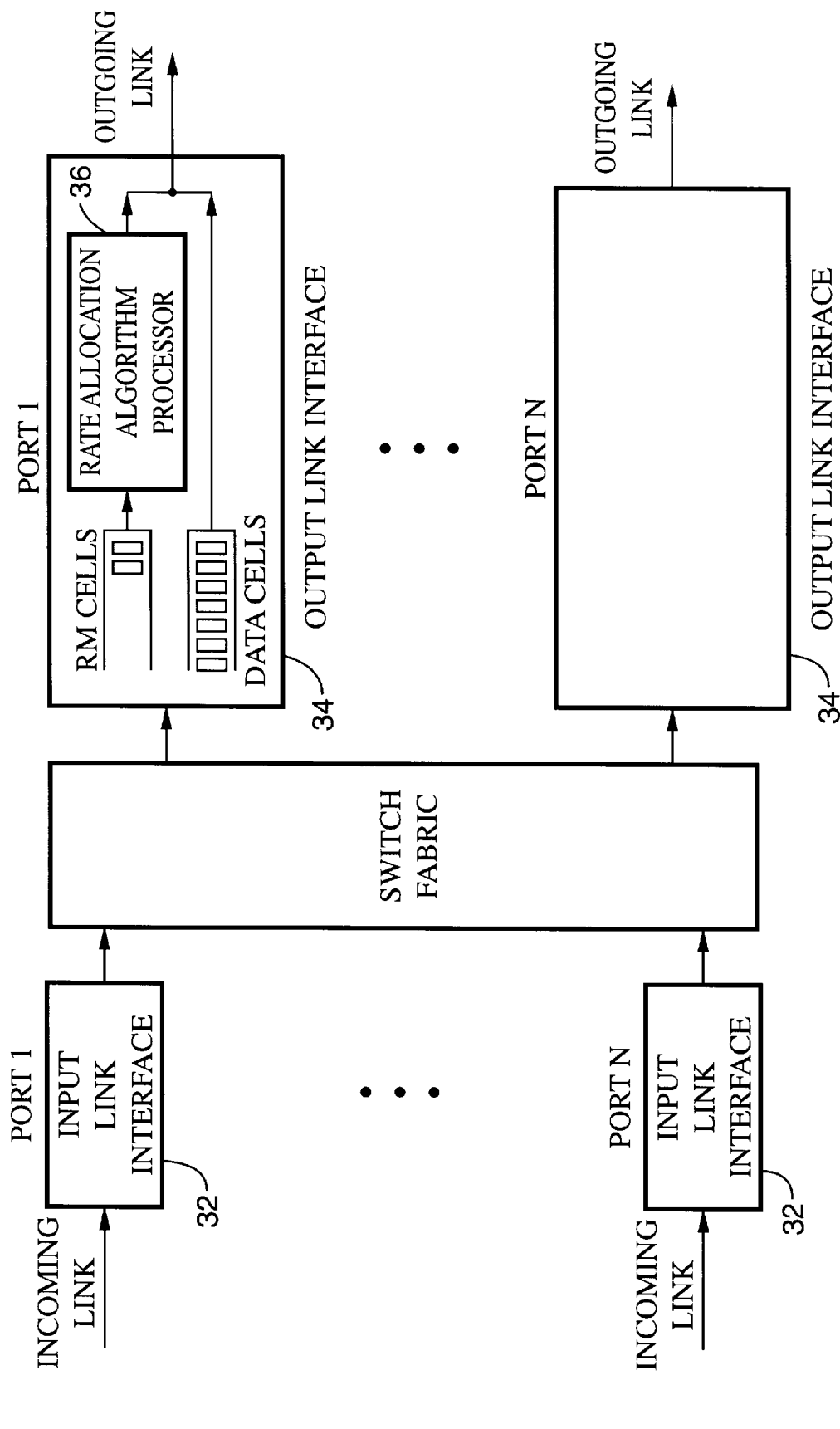
FIG. 3 is a functional block diagram showing an exemplary implementation of the congestion control method of the invention in an output buffered switch.

FIG. 3 shows a specific implementation of the congestion control method of the invention in an output buffered switch 30, that is, a switch having its buffering and congestion control processing at its output ports. As can be seen in the figure, this exemplary switch has a plurality of input ports (illustratively 1 to N) interfaced to the incoming links by Input Link Interface modules 32, and a plurality of output ports (illustratively also 1 to N) interfaced to the outgoing links by a corresponding plurality of Output Link Interface modules 34. Each of the Output Link Interface modules provides buffering and processing functionality for buffering data for connections traversing the link and, potentially, for separating the RM cells associated with a connection from data cells for that connection. Such separated RM cells are then fed to Rate Allocation Algorithm Processor 36 for processing in accordance with the algorithm of our invention. After such processing of the RM cells, they are then recombined with the data cells for the associated connection by the Output Link Interface module, such that the relative order of transmission of packets within each virtual circuit is maintained. While the case of separation and recombination of RM cells is illustrated, it should be understood that the invention does not preclude the processing of an RM cell without such separation and recombination. Such a non-separation practice does, however, require a relatively fast processor.

As previously indicated, a separate instance of the rate allocation algorithm is used to control the allocation of bandwidth on each outgoing link. Accordingly, it will be understood that each of the plurality of Output Link Interface modules will be configured to include Rate Allocation Algorithm Processor 30 in the same manner as depicted for the Output Link Interface module associated with Port 1, and will carry out the same buffering and processing functions described above for that illustrative Output Link Interface module.

Figure 4:
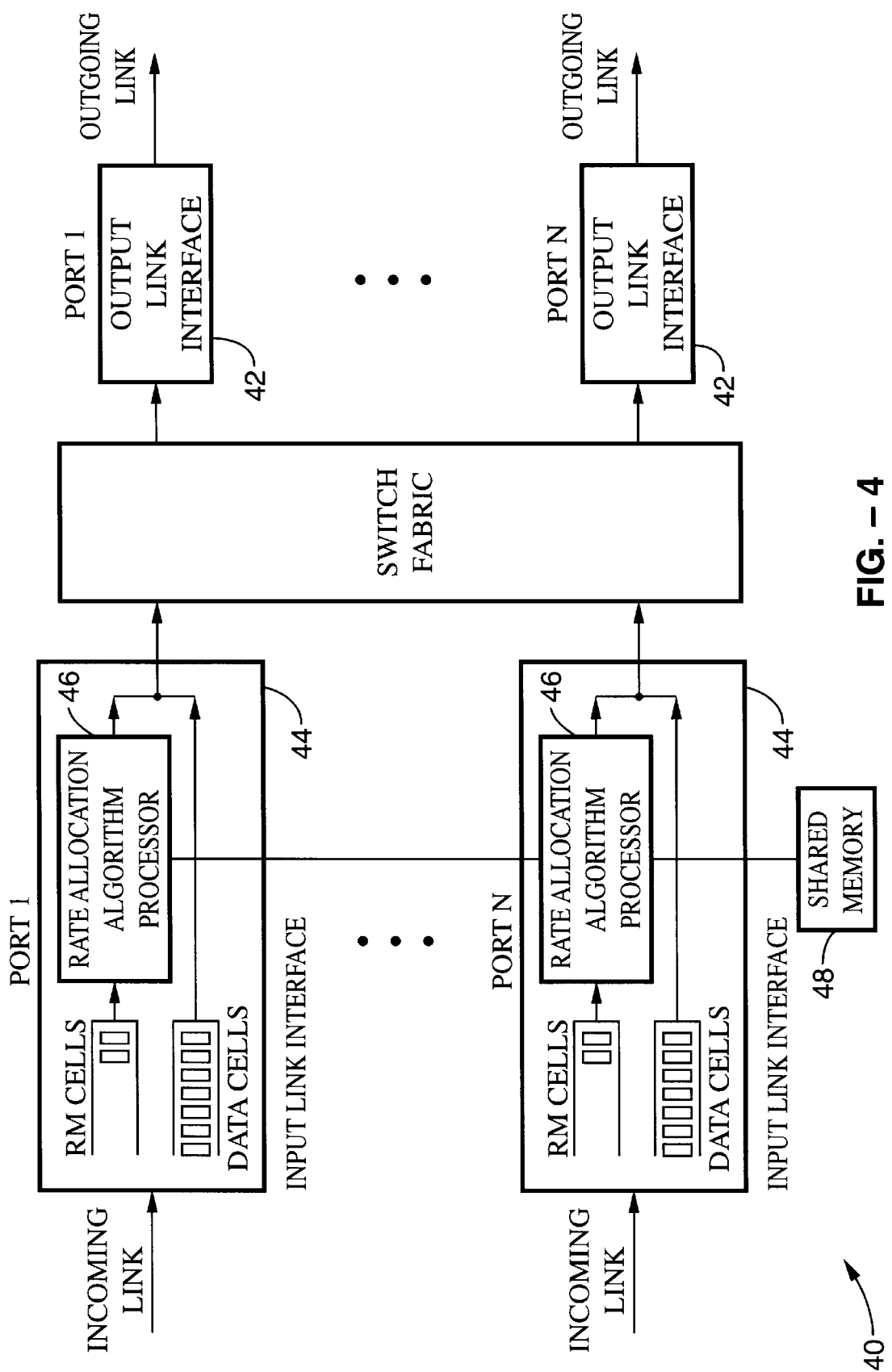
FIG. 4 is a functional block diagram showing an exemplary implementation of the congestion control method of the invention in an input buffered switch.

FIG. 4 provides a specific implementation of the congestion control method of the invention in an input buffered switch 40, that is, a switch having its buffering and congestion control processing at its input ports. As will be apparent from the figure, with respect to our invention's processing functions, Output Link Interface modules 42 correspond functionally to the Input Link Interface modules 32 of FIG. 3, and Input Link Interface modules 44, along with Rate Allocation Algorithm Processors 46, correspond essentially to Output Link Interface modules 34 and Rate Allocation Algorithm Processors 36 of FIG. 3. However, since with such an input buffered switch, the packets arriving at an input port of the switch may be destined to any of the output ports, it is not possible to run separate instances of the rate allocation algorithm independently at each input port. Instead, separate instances of the algorithm are run at each Input Link Interface, but each instance can perform allocations for any of the outgoing links. The collective algorithm instances maintain all of the shared allocation parameters in a common shared memory 48 to achieve this result. Synchronization among the multiple algorithm instances can be performed by the use of well known methods for locking accesses to shared variables during execution of the algorithm instances.

The congestion control method of our invention will also be applicable to multicast virtual circuits, that is, a common source transmitting to multiple destinations. Referring to FIG. 1, consider, as an illustrative multicast arrangement, a transmission from Source $S_3$ to Destinations $D_2$ and $D_3$. Since the path from $S_3$ to $D_2$ only traverses one switch (12b) while the path from $S_3$ to $D_3$ traverses two switches (12b and 12c). Switch 12c may represent a bottleneck, or bandwidth limitation, for the $S_3$ to $D_3$ path which did not exist in the $S_3$ to $D_2$ path. We deal with this potential constraint in some, but less than all, of the paths of a multicast transmission by setting the new CCR, upon return to the source of the collective RM cells for each of the multicast paths, to the minimum available bandwidth for any of those multicast paths. At any particular switch, the allocation to each one of the RM cells of the multicast flows of a multicast connection is the minimum allocation across all of the flows of the connection. The process of combining the returned RM cells for the several multicast paths can be performed by well known prior art methods. In our preferred embodiment for dealing with multicast flows, we require the switch to find the minimum ER value in the backward direction from among those cells in the multicast flows, that minimum ER value to be then placed in the combined RM cell which is then forwarded in the backward direction. However, this approach is not essential.

Having described the network environment for the implementation of our congestion control methodology, we now turn to a discussion of the specific functionality of that methodology. In the rate-based congestion control scheme which provides the infrastructure for our invention, the source of each connection requests a specific amount of bandwidth to be allocated to the connection by the switches on its path to the destination. In the preferred embodiment, using ATM technology, that request is carried by special RM cells transmitted periodically by the source. With this congestion control infrastructure, each RM cell has the following fields, as depicted in FIG. 2:

1. A virtual circuit identifier 22 for identifying the connection to which that cell belongs.
2. The amount of bandwidth requested, called the explicit rate (ER) 24.
3. The current cell rate (CCR) 26, which is set by the source of the connection and is not modified by the switches. This field indicates the current transmission rate of the source. It is assumed that the source would set the CCR field based on the ER value in the RM cell that was returned by the network most recently. The latter reflects the bandwidth available at the bottleneck link in the network at the time the most recent RM cell traversed it.
4. The Minimum Cell Rate (MCR) 28, which is set by the source of the connection and is not modified by the switches. This field indicates the minimum rate guaranteed by the network to the connection, and therefore represents the minimum bandwidth the switch must allocate to the connection. This field may be set to zero by the source when no such guarantee is required.
5. A bit 30 indicating the direction of the RM cell—which is necessary to distinguish an RM cell transmitted by the source of a connection from one returned by the destination to the source.

The cell can also include other fields 32. Note that the MCR field 28 described above is an improvement over the RM cell structure described by Kalampoukas et al. in U.S. Pat. No. 5,675,576. Note also that ER is the bandwidth requested by the connection during the current epoch, that is, traversal of the network from source to destination and return for the RM cell, while CCR is the current transmission rate of the source. As the RM cell passes through the network, each switch reads the ER and attempts to allocate this bandwidth on the output link. Assume that execution of a rate allocation algorithm in the switch produces $A_{max}$ as the maximum bandwidth that can be allocated to the connection without violating fairness. The switch then allocates the minimum among the CCR, ER, and $A_{max}$ to the connection on its outbound link. At the same time, if $A_{max}$ is less than ER, the request field in the RM cell is updated to $A_{max}$ before propagating the cell to the next switch. Thus, when the RM cell reaches the destination, the ER field reflects the bandwidth available at the bottleneck link along the path. It will be seen that, with the described approach, if CCR is less than ER or $A_{max}$, the allocation may be less than the value placed in the ER field of the forwarded RM cell, thus constituting this an aggressive bandwidth allocation approach. It would also be appropriate to follow a conservative approach and set the allocation as the minimum of the $A_{max}$ and ER values.

When the destination of a connection receives an RM cell, the cell is immediately returned to the source through a reverse path. On receipt of the RM cell, the source adjusts its rate to be within the value in the ER field, which represents the maximum fair bandwidth available to the connection on the bottleneck link. The CCR of subsequent RM cells will be set to reflect this new allocated rate. The source may request a change in its allocated rate by setting the ER field of RM cells to the desired value.

Note that rate allocation within a switch must be performed according to some fairness criterion, so that the total available bandwidth on the outbound link is divided fairly among the connections sharing the link. A commonly used fairness criterion is max-min fairness. To briefly illustrate the concept of max-min fairness, let $\rho_1, \rho_2, \ldots, \rho_N$ be the requests of individual connections sharing a link and $A_1, A_2, \ldots, A_N$ be the allocation produced by the rate allocation algorithm. The allocation is max-min fair, when a request is either completely satisfied, or receives an allocation equal to the maximum among all connections. That is, those bandwidth requests that are not completely satisfied by the allocation receive equal shares of the output bandwidth. In equation form, max-min fairness can be expressed as:

$$\text{if } A_i < \rho_i, \text{ then } A_i = \max_j A_j$$

In addition, the sum of the $A_i$s should equal the total bandwidth available if there is at least one connection with $A_i < \rho_i$. Thus, under such a max-min fairness allocation, each request is either completely satisfied or receives an identical share as any other connection that is not completely satisfied.

To complete the description of the network environment assumed by our rate allocation methodology, we also need to address briefly how the opening and closing of connections are handled in the algorithm. When a new connection is opened, each switch on its path will receive the virtual circuit identifier of the connection as part of the connection setup process. Before receiving the first RM cell from the connection, the switch under consideration will update a number of parameters maintained by the rate allocation algorithm, such as the number of active connections sharing the output link. The source may transmit data during the first round-trip epoch at a designated initial rate chosen small enough, for example, 1/1000 of the total link capacity, to avoid causing a short-term overload in the network.

Likewise, when a connection is closed, every switch on its path must be signaled to update the parameters maintained by the rate allocation algorithm.

Before we proceed to describe our rate allocation algorithm in detail, we will describe the main ideas on which that algorithm is based, along with needed definitions and notations. To illustrate the essential principles of our rate allocation algorithm, consider any switch in the path of a connection. Let S(t) be the set of active connections sharing the outbound link of this switch at time t. At any time, connections in S(t) can be in one of two states—bottlenecked or satisfied. We designate a connection as satisfied if, at the most recent update of its allocation, the connection's request was completely satisfied. The state of the connection is designated as bottlenecked if the allocation it received most recently at the switch was less than its request. We denote the set of satisfied connections at time t as $S_u(t)$ and the set of bottlenecked connections by $S_b(t)$. Let N(t), $N_u(t)$ and $N_b(t)$ denote the sizes of the sets S(t), $S_u(t)$, and $S_b(t)$, respectively.

Let B(t) be the total bandwidth available on the outbound link to allocate to best-effort traffic. Let $\rho_i$ be the value of the most recent request from connection i, as taken from the ER field of the most recent RM cell received in the forward direction from that connection. $A_i(t)$ represents the corresponding allocation received by connection i during its most recent update.

Note that an objective of our invention, which was not addressed in U.S. Pat. No. 5,675,576 to Kalampoukas et al., is to provide a minimum guaranteed rate for the connections, as specified in the Minimum Cell Rate (MCR) field of the RM cell. The way that minimum rate is guaranteed depends on the definition of fairness adopted. The ATM Forum has specified several definitions for fairness criteria. With the "MCR plus equal share" criterion, each connection is allocated the negotiated MCR plus a fair portion of the remaining bandwidth. Supporting this definition in our scheme is straightforward: every connection is allocated its MCR by default. The algorithm can then calculate a fair share of the remaining bandwidth, which is the total available bandwidth minus the sum of MCRs of all the connections.

A second fairness criterion is based on guaranteeing each connection the maximum of its MCR and the max-min share of the total bandwidth available. Supporting this option in more difficult. In the following discussion of the algorithm, this is the fairness option we consider.

To support a minimum guaranteed rate for the connections, we divide the connections into two sets: Connections for which the computed max-min fair rate is less than MCR are called "MCR-limited" and the others "normal". The algorithm keeps track of the number of MCR-limited connections, denoted by $N_l$, as well as the sum of MCRs for MCR-limited connections, $B_l$. An MCR-limited connection must be allocated bandwidth equal to its MCR to satisfy the minimum rate requirement. On receipt of an RM cell from a normal connection, the algorithm computes the fair allocation for the connection after excluding the MCR-limited connections. If the allocation so computed is less than it MCR, the state of the connection is changed to MCR-limited, and the allocation is set to MCR. The values of $B_l$ and $N_l$ are also updated accordingly. Similarly, when an RM-cell arrives from an MCR-limited connection, its fair share is computing assuming it is not MCR-limited. If this computed rate exceeds its MCR, the connection returns to the normal state and the overall bandwidth available for ABR connections is increased by the its MCR.

With this notation, we can now describe the key principles of our rate allocation algorithm. The algorithm is invoked whenever an RM cell is received from any of the connections sharing the outgoing link that it controls. In addition, parameters maintained by the algorithm must be initialized using separate initialization code when the algorithm is started; the parameters must also be updated when a new connection is opened or an existing connection closes. We begin by describing the main algorithm that is invoked for every forward RM cell. The initialization code and the code to update parameters during opening and closing of connections are described later.

As an initial matter, the goal of our methodology, and the algorithm which implements that methodology, is to make available to each bottlenecked connection at time t, a maximum bandwidth equal to $$A_{\max}(t) = \frac{\text{Total bandwidth available to bottleneck connections}}{\text{Number of bottlenecked connections}} \quad (1)$$

The total bandwidth available to bottlenecked connections is the bandwidth left over after allocating to satisfied connections. Therefore, the above equation becomes $$A_{\max}(t) = \frac{B(t) - \sum_{i \in S_u(t)} A_i(t)}{N_b(t)} \quad (2)$$

On receipt of an RM cell from a connection, the first step in the algorithm is to determine the new state of that connection with the current values of the parameters. This step is performed as follows: Assume that an RM cell is received from connection j, say at time $t_1$. If the connection j is currently marked as bottlenecked, the algorithm checks whether its state needs to be changed to satisfied. This is accomplished by means of the following calculations: The maximum bandwidth available to connection j, that is $A_{max}(t_1)$, is determined from Equation (2) above using the current values of the parameters in that equation. If the $A_{max}(t_1)$ so obtained is larger than the current request $\rho_j$ of connection j, then its state is changed to satisfied. On the other hand, if the connection j was in the satisfied state when the RM cell is received from it, then the algorithm checks if the state of the connection needs to be changed to the bottlenecked state, given the current values of the parameters. This checking is accomplished by temporarily setting the state of connection j as bottlenecked and going through a computation similar to that of Equation (2) to determine the maximum bandwidth that would be allocated to it. The following equation is used to determine Amax($t_1$) in this case.

$$A_{\max}(t) = \frac{B(t) - \sum_{i \in S_u(t)} A_i(t) + A_j(t)}{N_b(t) + 1} \quad (3)$$

The computations in both equations (2) and (3) can be performed without searching the state of each connection by maintaining the total bandwidth available for allocation to bottlenecked connections at time t, given by $$B_b(t) = B(t) - \sum_{i \in S_u(t)} A_i(t) \quad (4)$$

That is, the current bandwidth that can be allocated to bottlenecked connections is the total available bandwidth minus the total bandwidth currently allocated to connections in the satisfied state. Instead of $B_b(t)$, in our algorithm we maintain the quantity $$B_f(t) = B(t) - \sum_{i \in S_u(t)} A_i(t) - \sum_{i \in S_b(t)} \frac{B(t)}{N(t)} \quad (5)$$

We refer to $B_f(t)$ as the "free bandwidth." Note that $B(t)/N(t)$ is the equal share of a connection and is the minimum bandwidth it is entitled to receive under any fair allocation. We denote $B(t)/N(t)$ by $B_{eq}(t)$, the equal share. Since $N_b(t)+N_u(t)=N(t)$ (that is, the number of connections in bottlenecked and satisfied states must add up to the total number of active connections), Equation (5) can also be written as $$B_f(t) = N_u(t)B_{eq}(t) - \sum_{i \in S_u(t)} A_i(t) \quad (6)$$

Thus, the free bandwidth can be seen as the bandwidth available as a result of the satisfied connections not requesting their equal share. Using $B_f(t)$ to compute the allocation instead of the actual available bandwidth has an advantage—to wit: when a new connection is opened, $N(t)$ increases by one even before the connection sends its first RM cell (we assume a new connection is bottlenecked at this switch). This has the effect of reducing $B_f(t)$ in Equation (5), thus reducing the allocation to existing connections. This helps to reduce congestion during the transient period when the algorithm is converging to a new max-min fair allocation.

Since we use $B_f(t)$ instead of $B(t)$ in the algorithm, we re-write Equation (2), used to check state changes for bottlenecked connection, as follows:

$$A_{\max}(t) = B_{eq}(t) + \frac{B_f(t)}{N_b(t)} \quad (7)$$

Similarly, we re-write Equation (3), used to check state changes for a satisfied connection, as follows:

$$A_{\max}(t) = B_{eq}(t) + \frac{B_f(t) + A_j(t) - B_{eq}(t)}{N_b(t) + 1} \quad (8)$$

Thus, equations (7) and (8) are the actual ones used by the algorithm in its first step to detect state changes of connections. Note that, if a state change is found to occur, the parameters $N_b(t)$ and $N_u(t)$ must be updated to reflect the new state.

Once the state of connection j has been updated, the second step of the algorithm is to update the actual allocation maintained for the connection j. The new allocation $A_j(t_1)$ for connection j is computed based on the parameters of the RM cell received at $t_1$. If the maximum allocation $A_{max}(t_1)$, computed in the first step of the algorithm, is less than the Minimum Cell Rate (MCR) of the connection, then the allocation $A_j(t_1)$ is recorded as $A_{max}(t_1)$, otherwise, the allocation $A_j(t_1)$ is calculated as follows:

1. If the maximum allocation $A_{max}(t_1)$, computed in the first step of the algorithm, is less than both the request $\rho_j(t_1)$ and the value of CCR in the RM cell received, then the allocation $A_j(t_1)$ is recorded as $A_{max}(t_1)$.
2. If the computed $A_{max}(t_1)$ is equal to or more than the minimum of $\rho_j(t_1)$ and the value of CCR in the RM cell received, then $A_j(t_1)$ is recorded as the minimum of $\rho_j(t_1)$ and the value of CCR in the RM cell received.

In addition to recording the local allocation, the algorithm also updates the ER field of the RM cell before transmitting it through the outgoing link, when necessary. This update is performed as follows: if the computed $A_{max}(t_1)$ is less than the request $\rho_j(t_1)$ that is the value in the ER field of the received RM cell, then the algorithm also modifies the ER field of the RM cell before transmitting it. In this case the ER field is updated as the computed value of $A_{max}(t_1)$. When $A_{max}(t_1)$ is greater than or equal to $\rho_j(t_1)$, the ER field is not modified.

As previously noted, in the case of the CCR value in the RM cell received being less than $\rho_j(t_1)$ or $A_{max}(t_1)$, an aggressive allocation policy will allocate only the CCR value. However, a more conservative approach would record the allocation as the minimum of $A_{max}(t_1)$ or $\rho_j(t_1)$. This way, the amount of allocation recorded for connection j, that is, $A_j$, is the same as $A_{max}(t_1)$ even though the source is not using that rate, and is actually using only a smaller amount, CCP.

The algorithm requires a third step. The need for this step occurs only in the special case when the requests of all the connections sharing the outgoing link have been satisfied completely. Since there are no bottlenecked connections in this case, this presents a difficulty. If, for example, one of the connections were to increase its bandwidth request in such a way that the new request exceeds the bandwidth that can be allocated, the connection must now be marked bottlenecked. However, it is possible that, at that time, there is another connection in the satisfied state receiving a larger allocation than that which has been assigned to the bottlenecked connection. This situation can be prevented by finding the connection receiving the largest allocation and marking its state as bottlenecked even if it is receiving all its requested bandwidth. This prevents a situation where a connection in the satisfied state is actually receiving more bandwidth than another in the bottlenecked state. Thus, the algorithm maintains the virtual circuit identifier of the connection receiving the largest allocation in a separate variable and updates it on the receipt of every RM cell.

It will now be apparent that updates to our rate allocations can be done in $\Theta(1)$ time by maintaining current values of the following parameters, in addition to the current state of each connection. Note the significant differences between these parameters and those described in U.S. Pat. No. 5,676,576 to Kalampoukas et al.

1. The parameter $B_a$ representing the total bandwidth available for allocation on the outbound link for all the connections controlled by the algorithm.
2. The value $A_j$ corresponding to the current bandwidth allocation of each connection j.
3. The state of each connection: "bottlenecked" or "satisfied".
4. The number of bottlenecked connections $N_b$ and the total number of connections N.
5. MCR state of each connection: A one-bit flag indicating whether the connection is MCR-limited or not.
6. The index of the connection receiving the largest allocation.

Figure 5A:
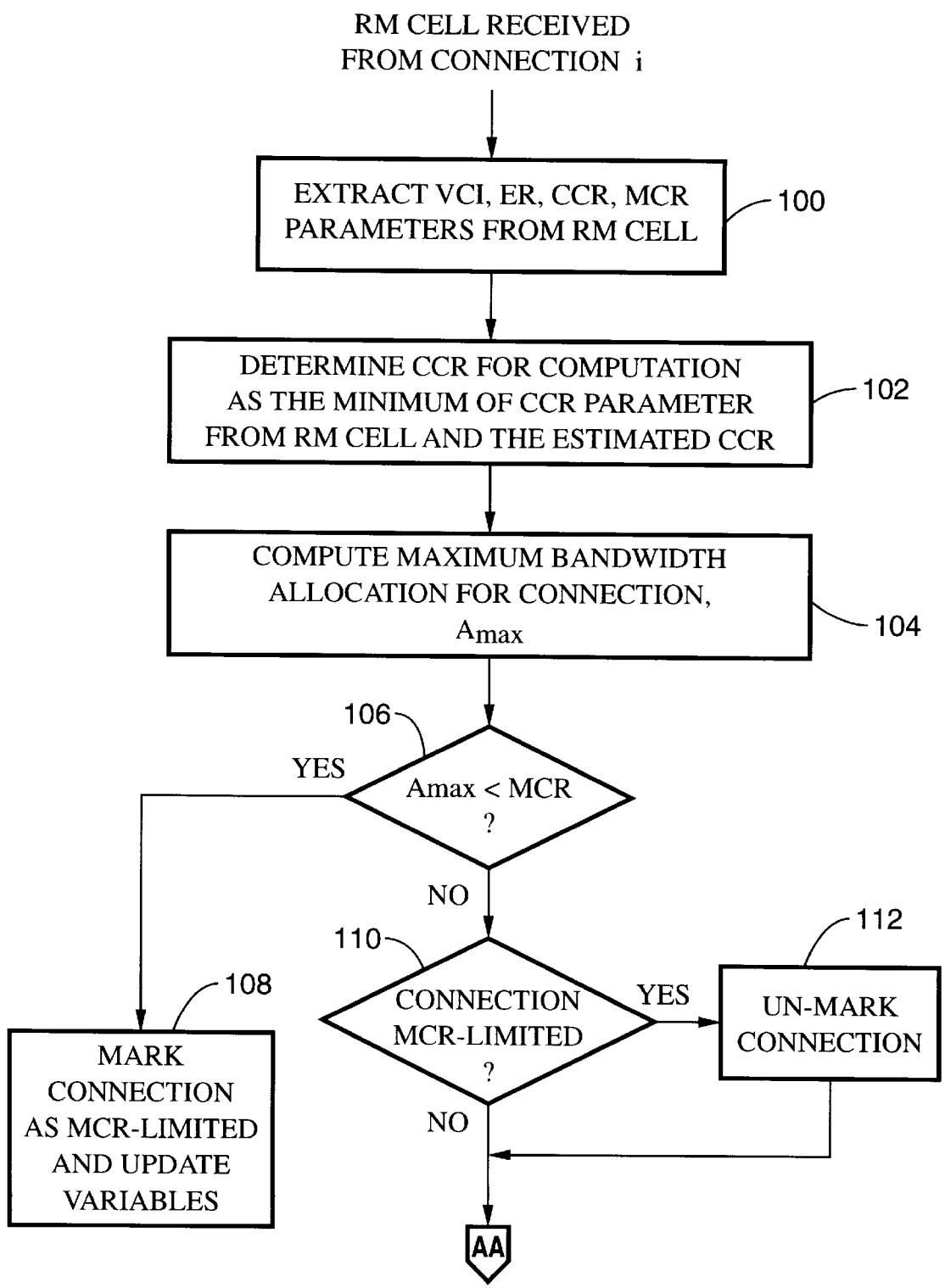
FIGS. 5A and 5B are a flow chart depicting the steps of the rate allocation method of the invention.
Figure 5B:
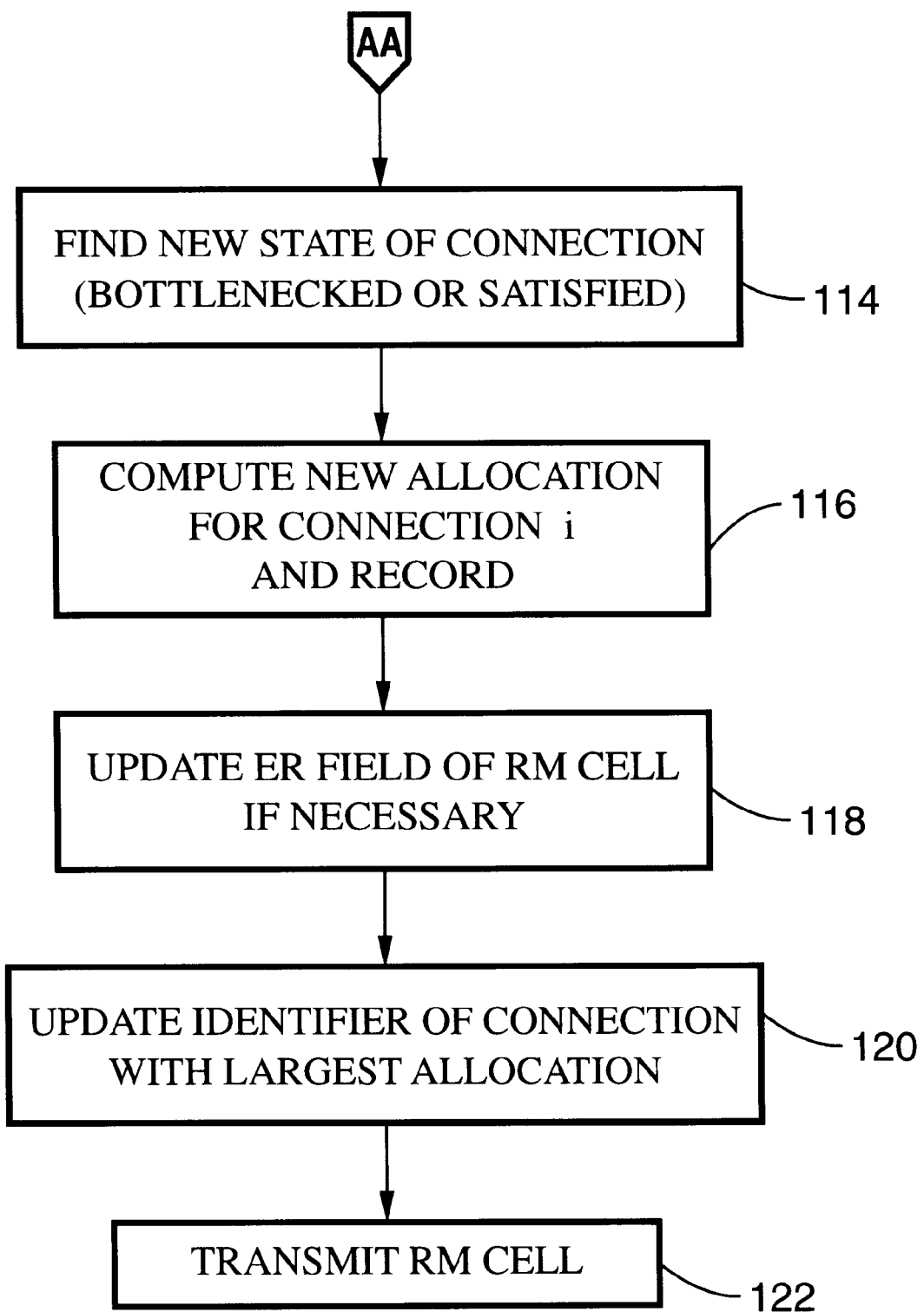

FIG. 5A and FIG. 5B summarize the steps performed on receipt of each RM cell at the switch in the forward direction. The pseudocode in FIG. 6A through FIG. 6G further elaborates the steps. A set of notations used in the presentation of the algorithm is given in FIG. 7A and FIG. 7B.

Referring to the flowchart of FIG. 5A and FIG. 5B, each time an RM cell is received by the switch, its connection identifier, ER, CCR, and MCR fields are read at step 100 (lines 1, 2, 4 of the pseudocode in FIG. 6A). Because the actual rate of the connection may vary from the value in the CCR field of the RM cell, our method maintains an estimate of the actual rate of the connection. Details of this estimation will be presented later. If the CCR value read from the RM cell is larger than this estimated rate, the former is replaced by the latter in the computation steps (line 3 of pseudocode) at step 102. The minimum of the ER and CCR values is then taken as the bandwidth request of the connection (line 5 of pseudocode).

Next, the algorithm computes the maximum fair allocation $A_{max}$ for the connection identified by the identifier in the RM cell, assuming its MCR is zero (step 104 of FIG. 5A). This calculation depends on whether the connection is currently bottlenecked or satisfied. If the connection is bottlenecked, the value of Amax is calculated using Equation 7, as explained before (line 8 of pseudocode). On the other hand, if the connection is in satisfied state, the computation of $A_{max}$ is as per Equation 8, as was pointed out before (line 10 of pseudocode). The algorithm also computes the equal share, denoted by $B_{eq}$, by dividing the total available bandwidth by the number of connections that are not MCR-limited (line 6 of pseudocode). If the computed value of $A_{max}$ is less than $B_{eq}$, $A_{max}$ is set to $B_{eq}$, so that the connection can be guaranteed at least its equal share of the total available bandwidth.

The next step of the algorithm is to check if the computed value of $A_{max}$ is less than the MCR parameter of the connection (step 106 of FIG. SA). If $A_{max}$ is less than MCR, the connection is marked MCR-limited and $A_{max}$ is set to MCR (step 108 of FIG. 5A, line 14 of pseudocode). In addition, if the connection was previously bottlenecked, its state is changed to satisfied, and the number of bottlenecked connections is also decremented (line 16 of pseudocode). This marking of connection j as MCR-limited also requires update of a number of algorithm variables, as given in lines 20 and 21 of the pseudocode. The number of MCR-limited connections is increased by 1, the total bandwidth consumed by MCR-limited connections is increased by the MCR value of the current connection j, the total available bandwidth is reduced by the MCR value, and equal share $B_{eq}$ is recomputed.

If, in step 106 of FIG. 5A, the value of $A_{max}$ is equal to or greater than the MCR of the connection, the connection is no longer MCR-limited. The connection is then tested at step 110 to determine if it is currently marked as MCR-limited. If the connection is currently marked as MCR-limited, it must be unmarked (step 112 of FIG. 5A, lines 25–27 of pseudocode) of the algorithm, and the variables $B_f$, $B_a$, $N_l$, and $B_{eq}$ updated.

The next step is to update the state of the connection (bottlenecked or satisfied), if it is not MCR-limited (step 114 of FIG. 5B). The new state is determined by lines 31–35 of the pseudocode. The local allocation of the connection (step 116 of FIG. 5B) is then computed: If the updated state of the connection is "satisfied", then the local allocation is simply its bandwidth request (line 39 of the pseudocode), whereas if it is bottlenecked the location allocation is set to the value of $A_{max}$ computed above (line 41 of pseudocode). If the ER value in the received RM cell is larger than the local allocation thus computed, the former is set to the latter (step 118 of FIG. 5B, line 43 of pseudocode).

The next step (Step 120 of FIG. 5B, lines 44–60 of the pseudocode) carries out the function of keeping track of the connection with the largest bandwidth request. This step, as discussed before, it meant to avoid oscillations in the allocation. If the bandwidth requested by connection j is more than the currently registered maximum requested bandwidth and the VC with the maximum registered request is not i, the algorithm changes the registered maximum requested bandwidth to the request of connection i, and also stores the VC identifier of connection i in the variable that holds the VC number of the connection with the largest request (line 46 of the pseudocode). Additionally, if the connection i is currently satisfied, its state is changed to bottlenecked (line 47–48 of pseudocode), so that the connection with the largest request always remains in the bottlenecked state, which is required for the correct operation of the algorithm.

If the current connection i is the registered VC with the maximum request, and the current VC is not MCR-limited, a new search for the VC with maximum request is started (lines 57–58 of pseudocode) by setting the value of the maximum registered request to zero and the corresponding VC number to −1 (invalid).

The final value of the local bandwidth allocation for VC i is calculated in lines 62–65 of the pseudocode. If the VC is bottlenecked, it is given its equal share, otherwise the allocation is the same as that computed on lines 38–42.

The last step is to update the free bandwidth variable $B_f$, taking into account any change in the local allocation of the VC j (line 67 of pseudocode).

Finally, on completion of the above steps, the RM cell is transmitted on the outbound link at step 122.

Backward RM Cell Processing

If processing of backward RM cells (BRMs) is possible, the algorithm can optionally be extended to become more responsive to traffic changes in certain network topologies. The pseudocode of FIG. 8 outlines the steps for processing an RM cell received in the backward direction, when such option is added to the algorithm. The ER field of BRM cells is updated when the bandwidth available in the forward direction for the given connection as indicated by the local allocation $A_i$ is greater than the value in the ER field. In this case the ER of the BRM cell is set to be equal to the local allocation for that connection in the forward direction.

It should noted that the processing of backward RM cells should be performed only when the corresponding connection in the forward direction is still open.

CCR Estimation

The CCR value obtained from the RM cell may not correspond to the actual rate of the connection. The latter may in fact be much lower than the former, resulting in severe under-utilization of the link. Therefore. in the pseudocode of FIG. 6A through FIG. 6G, instead of using the value in the CCR field of the RM cell for rate allocation, we estimate the transmission rate of each connection by measuring the interval between the reception of a certain number of cells from the given connection. This estimated rate is then used as the requested rate to the rate allocation algorithm. If n cells from connection j were received during an interval t, then the measured transmission rate $CCR_m$ of the connection is set equal to n/t. The value of n is a parameter that can be configured based on the particular environment where the invention is used.

The rate allocation algorithm uses the minimum of the estimated CCR and the CCR value provided by the RM cell as the input to the rate allocation algorithm (Line 3 of the pseudocode of FIG. 6A). This provides a level of protection against bursty and/or misbehaving sources.

Estimation of Available Bandwidth

The rate allocation algorithm requires exact knowledge of the total link bandwidth available for allocation to ABR connections, the parameter $B_a$ in the pseudocode of FIG. 6A through FIG. 6G. In practice, this parameter may not be known precisely. For example, if the set of connections controlled by the algorithm share the outbound link of the switch with other connections that have been assigned a fixed dedicated bandwidth, the link may remain under-utilized if the latter connections do not use their full bandwidth allocation. In addition, one or more of the connections controlled by the algorithm may remain idle for short periods, reducing link utilization. Therefore, it is necessary to estimate the available bandwidth parameter $B_a$ based on the utilization of the outgoing link.

The pseudocode in FIG. 9 estimates the link utilization U and uses this estimate to determine the bandwidth $B_a$ available for ABR traffic. If the measured link utilization is greater than 1, it is clamped to 1. This protects the network from unnecessary oscillations.

In the pseudocode, a timer set to a pre-determined value T is used to trigger the computation of average link utilization. The following notations are used in the pseudocode: B is the total capacity of the outgoing link, $B_v$ is the bandwidth reserved for other connections not controlled by the rate allocation algorithm, $m_T$ is the total number of cells that arrived at the outgoing port within the last T seconds, $U_T$ is the link utilization measured over the last T seconds interval, and w is a weighting factor used for the computation of the average link utilization. The suggested value for T is 10 milliseconds and for w, 0.125.

The pseudocode first computes the total utilization of the link over the last T seconds (line 1). This sample is then added to the smoothed average value of the utilization maintained by the algorithm by using the weighting factor w (line 2). If the utilization exceeds 1, it is clamped at 1 (line 3), and the number of cells received is reset to zero (line 4).

The utilization computed above is then used to estimate the bandwidth parameter $B_a$. The bandwidth $B_a$ is found by subtracting from the total bandwidth B the following quantities: the bandwidth assigned to other connections not controlled by the algorithm ($B_v$), the total MCR guaranteed rate of all the connections controlled by the algorithm ($B_j$), and the unused bandwidth on the link (1-U)B (line 5). The available bandwidth is set never to exceed the total bandwidth B. The pseudocode also updates the parameters $B_{eq}$ and $B_f$ used in the pseudocode of FIG. 6A through FIG. 6G.

Note that this algorithm also updates the estimate of the bandwidth $B_a$ that is available for carrying ABR traffic. The free bandwidth $B_f$ is also updated accordingly. Also, the equal share resulting after updating the estimate $B_a$ of bandwidth for ABR traffic is not computed in the case when all the ABR connections are MCR-limited; otherwise the division operation would result in a divide-by-zero exception.

An important consequence of using the formula shown on line 5 of the pseudocode for computing $B_a$ is that the ABR traffic will only be able to use 50% of the unused bandwidth reserved for CBR and VBR traffic. This is a desirable property since at any time it is possible that these real-time connections will claim back the reserved bandwidth and severe congestion can result if more of the bandwidth is allocated to ABR traffic.

Recovering Bandwidth from Idle Connections

The rate-allocation algorithm modifies the allocation of a connection only upon receipt of an RM cell from the connection. Thus, a connection that remains idle for a long period can maintain its allocation at the switch, potentially causing under-utilization of the link bandwidth. The solution lies in periodically scanning the allocation table and reducing the allocations for connections that have not transmitted an RM cell within a timeout interval, maintaining only a minimum rate (MCR) for these connections. This scanning algorithm can be run as a background process that is interrupted on receipt of an RM cell, which invokes the rate allocation algorithm.

Initialization

Several parameters used in the algorithm need to be initialized at startup. In addition, some parameters need to be updated when a new connection is set up or an existing connection is terminated. The initializations performed at startup are shown in the pseudocode of FIG. 10. Several global variables associated with each outgoing port of the switch need to be set to their initial values prior to processing any RM cell. When a new connection is opened, the operations performed are outlined in the pseudocode of FIG. 11. Similarly, when an existing connection is closed, the steps performed are given in FIG. 12A and FIG. 12B. Note that the rate allocation algorithm requires knowledge of the connection that is receiving maximum allocation at any time. Therefore, when a connection that is currently marked as receiving the highest allocation is closed, the algorithm must initiate a new cycle of computations to determine the connection with the highest allocation. This part appears on lines 6–8 of the pseudocode in FIG. 12A, executed when the connection closes.

Although the present embodiment of the invention has been described in detail, it should be understood that various changes, alterations and substitutions can be made therein without departing from the spirit and scope of the invention as defined by the appended claims. In particular, it is noted that, while the invention has been primarily described in terms of a preferred embodiment based on ATM technology, the method and concept of the invention may be applied with respect to any packet oriented communications network.

What is claimed is:

1. A congestion control method for communications networks having a plurality of connections to switches, wherein each connection has a current transmission rate, wherein the source of each connection requests a specific amount of bandwidth to be allocated to the connection by the switches on its path to the destination, and wherein requests for bandwidth allocation are carried by resource management (RM) cells transmitted periodically by the source, comprising the steps of:

(a) estimating the current transmission rate of each connection by measuring the time interval between the reception of a plurality of resource management (RM) cells from the given connection;

(b) allocating bandwidth using said estimated transmission rate as the requested rate;

(c) designating a connection for which a max-min fairness rate for that connection is less than the minimum cell rate (MCR) for that connection as a MCR-limited connection; and (d) allocating bandwidth to said MCR-limited connection equal to said connection's MCR to satisfy a minimum rate requirement for that connection.

2. A method as recited in claim 1, further comprising the steps of setting the current transmission rate of a connection equal to $n_j/t_j$ if $n_j$ cells from a connection j are received during an interval $t_j$ in which said plurality RM cells were received.

3. A method as recited in claim 1, further comprising the steps of updating the actual bandwidth allocation maintained for a connections wherein the new allocation $A_j(t_1)$ for connection j is determined according to the steps comprising,
  (i) if the maximum allocation $A_{max}(t_1)$ is less than the MCR of the connection, setting $A_j(t_1)$ to $A_{max}(t_1)$,
  (ii) if the maximum allocation $A_{max}(t_1)$ is less than both the request $\rho_j(t_1)$ and the value of CCR in the RM cell received, setting $A_j(t_1)$ to $A_{max}(t_1)$, and
  (iii) if the computed $A_{max}(t_1)$ is equal to or more than the minimum of $\rho_j(t_1)$ and the value of CCR in the RM cell received, setting $A_j(t_1)$ to the minimum of $\rho_j(t_1)$ and the value of CCR in the RM cell received.

4. A method as recited in claim 1, further comprising the steps of estimating the bandwidth of each connection from its actual bandwidth usage.

5. A method as recited in claim 1, further comprising the steps of estimating the available bandwidth on an output link carrying said connections.

6. A method as recited in claim 1, further comprising the steps of recovering bandwidth from connections that remain idle for specified periods.

7. A congestion control method for communications networks having a plurality of connections to switches, wherein each connection has a current transmission rate, wherein the source of each connection requests a specific amount of bandwidth to be allocated to the connection by the switches on its path to the destination, and wherein requests for bandwidth allocation are carried by resource management (RM) cells transmitted periodically by the source, comprising the steps of:
  (a) estimating the current transmission rate of each connection by measuring the time interval between the reception of a plurality of resource management (RM) cells from the given connection;
  (b) allocating bandwidth using said estimated transmission rate as the requested rate;
  (c) setting the current transmission rate of a connection equal to $n_j/t_j$ if $n_j$ cells from a connection j are received during an interval $t_j$ in which said plurality RM cells were received; and
  (d) designating a connection for which a max-min fairness rate for that connection is less than the minimum cell rate (MCR) for that connection as a MCR-limited connection; and
  (e) allocating bandwidth to said MCR-limited connection equal to said connection's MCR to satisfy a minimum rate requirement for that connection.

8. A method as recited in claim 7, further comprising the steps of updating the actual bandwidth allocation maintained for a connection j wherein the new allocation $A_j(t_1)$ for connection j is determined according to the steps comprising,
  (i) if the maximum allocation $A_{max}(t_1)$ is less than the MCR of the connection, setting $A_j(t_1)$ to $A_{max}(t_1)$,
  (ii) if the maximum allocation $A_{max}(t_1)$ is less than both the request $\rho_j(t_1)$ and the value of CCR in the RM cell received, setting $A_j(t_1)$ to $A_{max}(t_1)$, and
  (iii) if the computed $A_{max}(t_1)$ is equal to or more than the minimum of $\rho_j(t_1)$ and the value of CCR in the RM cell received, setting $A_j(t_1)$ to the minimum of $\rho_j(t_1)$ and the value of CCR in the RM cell received.

9. A method as recited in claim 8, further comprising the steps of estimating the bandwidth of each connection from its actual bandwidth usage.

10. A method as recited in claim 9, further comprising the steps of estimating the available bandwidth on an output link carrying said connections.

11. A method as recited in claim 10, further comprising the steps of recovering bandwidth from connections that remain idle for specified periods.

12. A congestion control method for communications networks having a plurality of connections to switches, wherein each connection has a current transmission rate, wherein the source of each connection requests a specific amount of bandwidth to be allocated to the connection by the switches on its path to the destination and wherein requests for bandwidth allocation are carried by resource management (RM) cells transmitted periodically by the source, said RM cells having a minimum cell rate (MCR) comprising the steps of:
  (a) estimating the current transmission rate of each connection by measuring the time interval between the reception of a plurality of resource management (RM) cells from the given connection;
  (b) allocating bandwidth using said estimated transmission rate as the requested rate;
  (c) setting the current transmission rate of a connection equal to $n_j/t_j$ if $n_j$ cells from a connections j are received during an interval $t_j$ in which said plurality RM cells were received;
  (d) designating a connection for which a max-min fairness rate for that connection is less than the MCR for that connection as a MCR-limited connection;
  (e) allocating bandwidth to said MCR-limited connection equal to said connection's MCR to satisfy a minimum rate requirement for that connection;
  (f) updating the actual bandwidth allocation maintained for a connection j wherein the new allocation $A_j(t_1)$ for connection j is determined according to the steps comprising,
    (i) if the maximum allocation $A_{max}(t_1)$ is less than the MCR of the connection, setting $A_j(t_1)$ to $A_{max}(t_1)$,
    (ii) if the maximum allocation $A_{max}(t_1)$ is less than both the request $\rho_j(t_1)$ and the value of CCR in the RM cell received, setting $A_j(t_1)$ to $A_{max}(t_1)$, and
    (iii) if the computed $A_{max}(t_1)$ is equal to or more than the minimum of $\rho_j(t_1)$ and the value of CCR in the RM cell received, setting $A_j(t_1)$ to the minimum of $\rho_j(t_1)$ and the value of CCR in the RM cell received,
  (g) estimating the bandwidth of each connection from its actual bandwidth usage;
  (h) estimating the available bandwidth on an output link carrying said connections; and
  (i) recovering bandwidth from connections that remain idle for specified periods.

13. A congestion control method for communications networks having a plurality of connections to switches, wherein each connection has a current transmission rate, wherein the source of each connection requests a specific amount of bandwidth to be allocated to the connection by the switches on its path to the destination, and wherein requests for bandwidth allocation are carried by resource management (RM) cells transmitted periodically by the source, comprising the steps of:
  (a) estimating the current transmission rate of each connection by measuring the time interval between the reception of a plurality of resource management (RM) cells from the given connection;
  (b) allocating bandwidth using said estimated transmission rate as the requested rate; and (c) updating the actual bandwidth allocation maintained for a connection j wherein the new allocation $A_j(t_1)$ for connection j is determined according to the steps comprising,
  (i) if the maximum allocation $A_{max}(t_1)$ is less than the minimum cell rate (MCR) of the connection, setting $A_j(t_1)$ to $A_{max}(t_1)$,
  (ii) if the maximum allocation $A_{max}(t_1)$ is less than both the request $\rho_j(t_1)$ and the value of current cell rate (CCR) in the RM cell received, setting $A_j(t_1)$ to $A_{max}(t_1)$, and
  (iii) if the computed $A_{max}(t_1)$ is equal to or more than the minimum of $\rho_j(t_1)$ and the value of CCR in the RM cell received, setting $A_j(t_1)$ to the minimum of $\rho_j(t_1)$ and the value of CCR in the RM cell received.

14. A method as recited in claim 13, further comprising the steps of setting the current transmission rate of a connection equal to $n_j/t_j$ if $n_j$ cells from a connection j are received during an interval $t_j$ in which said plurality RM cells were received.

15. A method as recited in claim 13, wherein said RM cells include a minimum cell rate (MCR), and further comprising the steps of:
  (d) designating a connection for which a max-min fairness rate for that connection is less than the MCR for that connection as a MCR-limited connection; and
  (e) allocating bandwidth to said MCR-limited connection equal to said connection's MCR to satisfy a minimum rate requirement for that connection.

16. A method as recited in claim 13, further comprising the steps of estimating the bandwidth of each connection from its actual bandwidth usage.

17. A method as recited in claim 13, further comprising the steps of estimating the available bandwidth on an output link carrying said connections.

18. A method as recited in claim 13, further comprising the steps of recovering bandwidth from connections that remain idle for specified periods.

\* \* \* \* \*